May 25, 1948.　　　　J. L. BOYER ET AL　　　　2,442,261
ELECTRONIC FREQUENCY CHANGER
Filed April 5, 1947　　　3 Sheets-Sheet 1

INVENTORS
John L. Boyer and
Charles Gordon Hagensick.
BY O. D. Buchanan
ATTORNEY

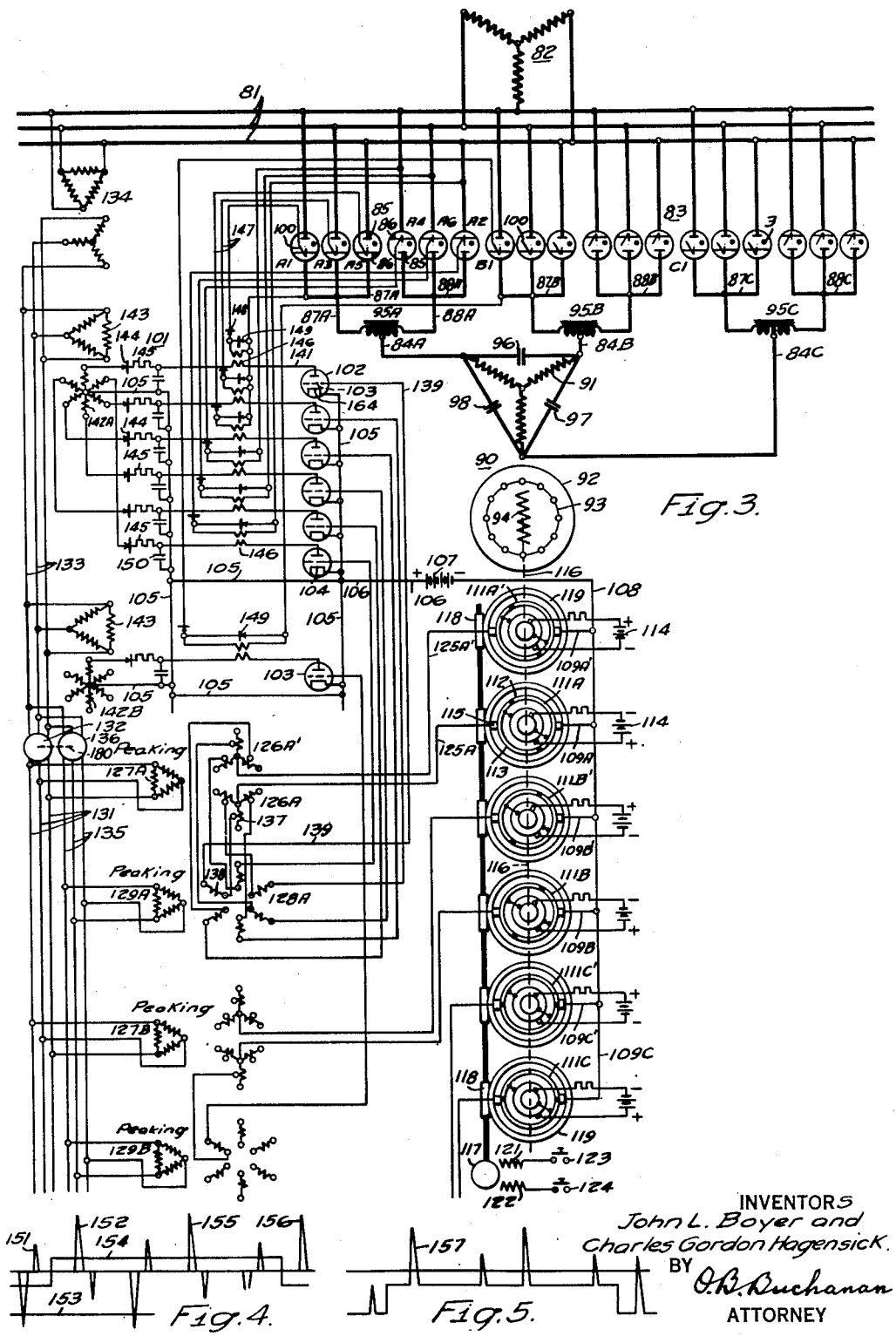

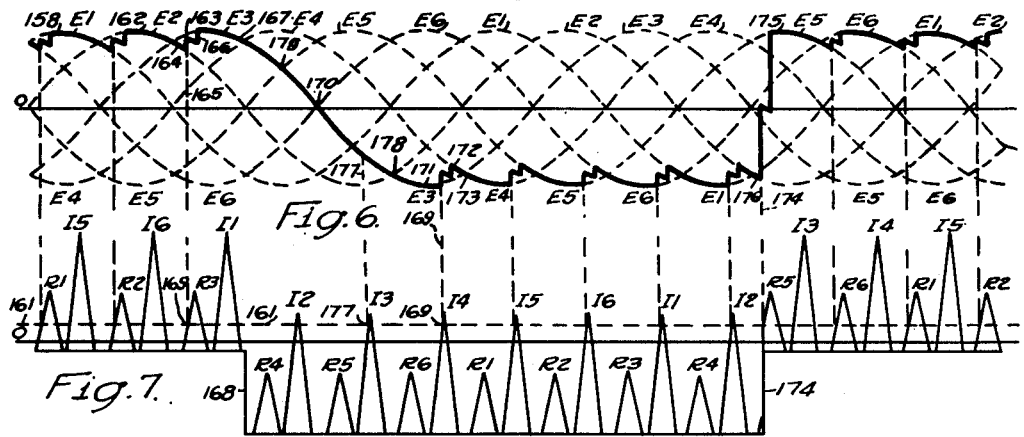
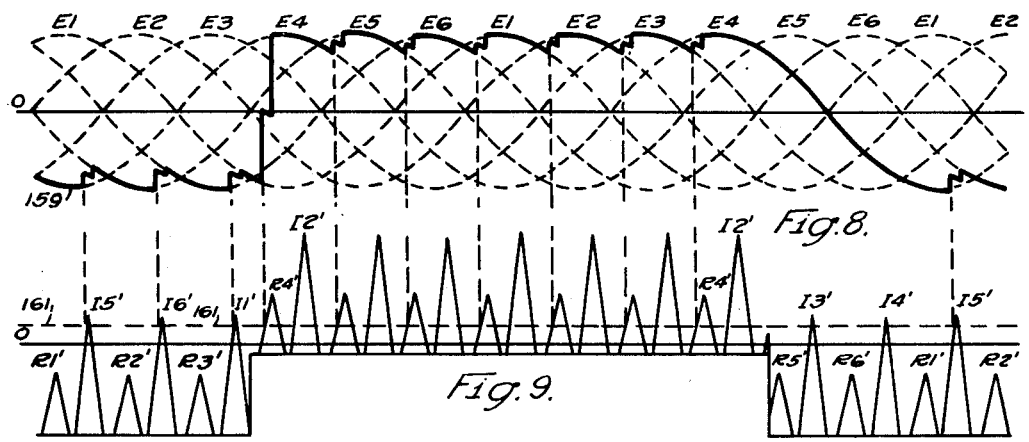
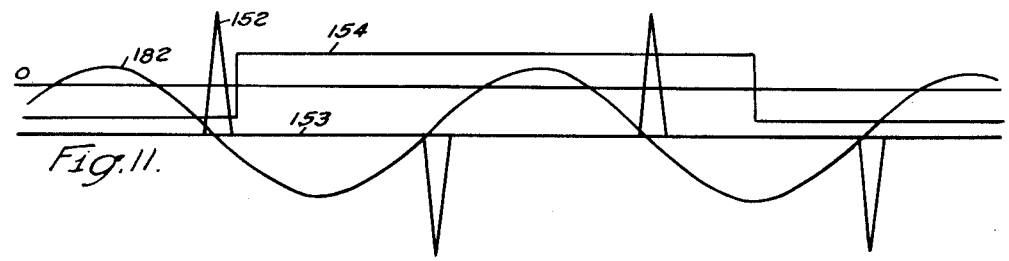
INVENTORS
John L. Boyer and
Charles Gordon Hagensick
BY
O. B. Buchanan
ATTORNEY Patented May 25, 1948

2,442,261

UNITED STATES PATENT OFFICE 2,442,261

ELECTRONIC FREQUENCY CHANGER

John L. Boyer and Charles Gordon Hagensick, Wilkinsburg, Pa., assignors to Westinghouse Electric Corporation, East Pittsburgh, Pa., a corporation of Pennsylvania Application April 5, 1947, Serial No. 739,723

24 Claims. (Cl. 172—281)

Our invention relates to rectifier and inverter converters consisting of a plurality of groups of specially controlled tubes, and tube-circuits therefor. While certain features of our invention are of more general application, our invention was designed particularly for an electronic frequency-changer known as a cycloconverter, and it was still more particularly designed for supplying power from a higher-frequency input-circuit, generally of a constant frequency, and generally polyphase, to a lower-frequency load-circuit which may be either single-phase or polyphase, and which may or may not have a variable frequency. The direction of the power-flow may also be reversed.

A cycloconverter comprises two groups of tubes for each phase of the output-frequency, and both groups of tubes are so controlled that they are capable of acting alternately as rectifiers and inverters, thus going through cycles of rectification and inversion, hence the name "cycloconverter."

The tubes are preferably either hot-cathode gas-filled tubes, or ignitrons, or other tubes having a control-circuit, and having a main anode-and-cathode circuit which has a tendency to become conducting whenever the tube is fired by having its control-circuit become sufficiently positive to attain at least a critical tube-firing control-voltage with respect to its cathode at a time when its anode is sufficiently positive with respect to its cathode; the tube, when fired, having a tendency to remain conducting, independent of the control-element, until the anode becomes less positive than the cathode. The control-element may be a control-grid; or, in the case of an ignitron, the control-element may be either a control-grid or an ignitor.

A principal object of our present invention is to provide a novel control-circuit for the cycloconverter tubes, whereby the firing points or phase-angles are readily and accurately and individually controlled, so as to give the best power-factor on the supply-circuit, or to control the output-voltage, as may be desired. The control-circuit of each of the cycloconverter tubes utilizes two supply-frequency grid-control transformers, preferably peaking, with their secondaries connected in series with each other. Phaseshifter means are provided, for separately controlling the phase of each grid-control transformer. One of said grid-control transformers has a lower voltage than the other, the low-voltage transformer being phased to control the starting or firing of the cycloconverter tube during rectifying operation, while the higher-voltage transformer is phased to control the starting or firing of the same cycloconverter tube during inverter operation.

Combined with these two serially connected grid-control peaking-transformers is a serially connected, modulated, biasing-means, which is modulated at the desired output-frequency, so that, at alternate intervals, the grid-bias is sufficiently negative to render the rectifying peaks incapable of firing their tubes, while the inverting peaks are effective to fire the tubes, followed by intervals in which the grid-bias is such that both sets of peaks are effective to control the respective tubes. The cycloconverter tubes for each output-phase are disposed in two similar groups, and the control-circuits for these two groups are so arranged that the rectifier peaks for the tubes of one group are substantially in the middle of a blocked period, while the rectifier peaks of the tubes of the other group are substantially in the middle of a period in which they are effective to control the tubes of that group. The inverter peaks are always effective to control their respective tubes, whenever the anode of the tube is sufficiently positive with respect to its cathode.

More specifically, an object of our invention is to provide the equivalent of four serially connected control-voltages in the control-circuit of each of the cycloconverter tubes, namely a low-voltage rectifying-firing peak, a high-voltage inverting-firing peak, a constant negative-bias voltage, and a single-phase modulating-voltage of the desired output-frequency of the cycloconverter, the modulator-wave being preferably square-topped, although it might also be sinusoidal or of other wave-form.

With the foregoing and other objects in view, our invention consists in the circuits, combinations, systems, methods, apparatus and parts, hereinafter described and claimed, and illustrated in the accompanying drawing, wherein:

Fig. 3 is a similar view illustrating a third form of embodiment of our invention, in a 3-phase cycloconverter system for supplying a 3-phase output-circuit, and Figs. 4 to 12 are curve-diagrams illustrative of the operation of the invention.

Figures 1, 2:
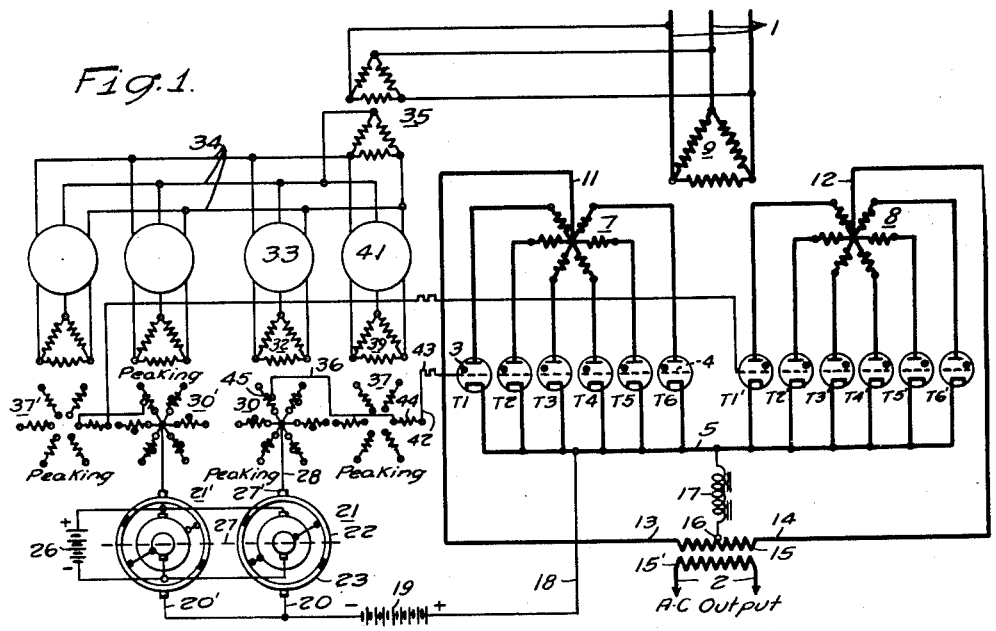
Figures 1 and 2 are simplified diagrammatic views of circuits and apparatus illustrative of two different forms of embodiment of our invention, utilizing 6-phase cycloconverters for supplying a single-phase alternating-current output.

In Fig. 1, our invention is embodied in a 6- phase cycloconverter for converting power between a 3-phase input-circuit or supply-circuit 1, and a single-phase output-circuit 2 having a frequency lower than the input-circuit. The supply-circuit 1 may be a constant-frequency 60-cycle system, or any other alternating-current supply-system, usually polyphase, while the output-circuit 2 may either be of a constant frequency, such as a 25-cycle system, or it may be of a variable frequency, which may be controlled.

While we refer to the supply and load circuits 1 and 2 as input and output circuits respectively, we wish it to be understood that the direction of power-flow is reversible, so that power may be interchanged in either direction between these two circuits, the words "input" and "output" being utilized, merely as a matter of convenience, to refer to circuits which ordinarily serve as the input and output circuits, respectively, in most applications of our invention.

The cycloconverter of Fig. 1 utilizes twelve main power-tubes arranged in two groups, the tubes of the first group being designated T1 to T6, and the tubes of the second group being designated T1' to T6'. These two groups may be referred to as the positive and negative groups respectively, with the understanding that each group goes through cycles of alternate positive and negative-voltage operation, at the output-frequency. Each of the main power-tubes may be either a hot-cathode gas-filled tube or an ignitron, having a suitable control-electrode. In Fig. 1, the main power-tubes are gas-filled hot-cathode tubes; while in Figs. 2 and 3 the main power-tubes are ignitrons. In each case, a tiny circle or dot 3 has been placed within the diagrammatic representation of the tube, as a convention for indicating the presence of a gas or vapor, or other means for causing the control-electrode of the tube to become ineffective, in general, to stop the firing of the tube, once the firing has been initiated.

In Fig. 1, the control-electrodes are grids, as indicated at 4. In Fig. 1, also, the cathodes of all twelve of the main power-tubes are connected together in a single cathode-circuit 5, although other circuit-arrangements may be utilized, as indicated in Figs. 2 and 3, respectively, as will subsequently be described.

The two groups of cycloconverter tubes, in Fig. 1, are shown as being energized from two star-connected 6-phase secondary windings 7 and 8 of a main power-transformer, the primary winding of which is indicated at 9. This primary winding 9 is excited from the input-circuit 1. The two secondary windings 7 and 8 have separate neutral circuits 11 and 12, respectively, which are brought out to the two terminals 13 and 14 of a balancing transformer or inductive winding 15 having a midpoint tap 16.

A common direct-current return-circuit path is provided, for the two groups of cycloconverter tubes, by means of a circuit preferably containing a ripple-smoothing choke-coil or direct-current reactor 17, joining the two direct-current output-terminals of the two groups of tubes. One of these terminals in the cathode-terminal 5, and the other terminal is the midtap 16 of the balancing-transformer winding 15 which is connected to the two neutral points 11 and 12 of the main power-transformer secondaries 7 and 8, respectively. In the form of embodiment of our invention which is shown in Fig. 1, the direct-current return-circuit, which includes the choke coil 17, is thus connected between the common cathode-bus 5 and the midtap 16.

The output-circuit 2 is energized from the balancing transformer 15, either by being connected to a secondary winding 15' which is inductively associated with the midtapped primary winding 15, as shown in Fig. 1, or, as shown in Fig. 2, by being directly conductively connected to the two terminals of the midtapped winding 15, utilizing the latter as an autotransformer.

Each of the twelve control-grids 4 of the main power-tubes has its own control-circuit, some parts of which are individual to each particular tube, while other parts of the control-circuit are common to all of the tubes or to tubes of one or the other of the two groups of cycloconverter tubes. Since the circuit of Fig. 1 has all twelve of the cathodes connected to a common cathode-circuit or bus 5, the grid-control circuits of all tubes have a common terminal 18, starting at the cathode-bus 5, and containing a negative biasing-source which is indicated as a battery 19. Here, the grid-control circuit divides into two branch-circuits 20 and 20', both of which are connected to the negative terminal of the biasing battery 19.

The two branch-circuits 20 and 20' of the grid-control circuit 18 each include an alternating-current square-topped modulator-voltage source, which is symbolically indicated as a rotating commutator 21, 21', respectively, each having two conducting segments 22 and 23 which are substantially 180 electrical degrees in length, the segments being connected to two slip-rings which are energized from the terminals of a modulator-voltage source such as a battery 26. The two rotating cummutators 21 and 21' are mounted on a common shaft, which is diagrammatically indicated at 27, and are driven at the synchronous speed of the desired output-frequency of the output-circuit 2. The two modulator-commutators 21 and 21' are oppositely connected, so that a positive voltage is supplied in one of the two branch control-circuits 20 and 21', while a negative voltage is supplied in the other circuit, and vice versa.

After passing through the modulator-sources 21 and 21', respectively, the two branch control-circuits are each split into six separate circuits, for separately controlling the six cycloconverter tubes corresponding to the associated group. As the circuits are similar, they will be understood by a description of only the grid-control circuit for energizing the first main power-tube T1 of the first group of six cycloconverter tubes. This circuit may be traced, from the modulator-commutator 21, through a conductor 28 which leads to the neutral point of a set of 6-phase-connected secondary windings 30 of three single-phase peaking-transformers, the peaking-transformers having 3-phase-connected primary windings 32 which are energized, through a phase-shifter 33, from an auxiliary input-frequency polyphase circuit 34 which is energized from the main input-circuit 1, through an auxiliary power-transformer 35.

The proper phase of the 6-phase-connected secondary windings 30, corresponding to the phase of the voltage which is supplied to the anode of the main tube T1, is utilized to energize the grid-control circuit for said main tube T1, and this control-circuit then continues, through the conductor 36, to the proper phase of the open-star, 6-phase-connected secondary windings 37 of other single-phase peaking-transformers, having 3- phase-connected primary windings 39 which are energized, through another phase-shifter 41, from the auxiliary input-frequency circuit 34. The grid-control circuit of the tube T1 then continues, through a conductor 42, to the control-grid 4 of the main cycloconverter-tube T1, a current-limiting resistor 43 being preferably included in this circuit.

The first-mentioned group of peaking-transformers 32—36 is phase to deliver peaks in the proper phase for rectifier-operation of the main tube T1, while the second-mentioned group of peaking-transformers 36—37 is phased to deliver peaks in the proper phase for inverter-operation of the tube T1. To this end, the control-circuit of the tube T1 utilizes an inverter-peaker phase 44 which lags 120° (more or less) behind the phase 45 which is selected from the rectifier peaking transformer, further phase-adjustments being obtained by means of the two phase-shifters 33 and 41.

It will be understood that the other five tubes of the cycloconverter group which comprises the tubes T1 to T6 will be energized from the remaining phases of the respective secondary windings 36 and 37 of the two groups of peaking transformers, while the six control-circuits for the second group of cycloconverter tubes T1' to T6' are similarly energized from similar peaking-transformer secondary windings 36' and 37', in series with the other modulator-commutator 21'.

Fig. 2 shows a circuit in which the main power-transformer 9 has a single star-connected 6-phase secondary winding 46, each phase of which is connected to a correspondingly numbered tube in each of the two cycloconverter groups T1 to T6, respectively, and T1' to T6', respectively. For example, the phase 47 of the secondary winding 46 is connected to the anodes of the tubes T1 and T1'. The two groups of cycloconverter tubes thus have a common negative direct-current output-terminal, which is the neutral terminals 48 of the power-transformer secondary 46, this terminal coresponding to the midpoint 16 in Fig. 1. In Fig. 2, therefore, the cathode-circuits of the two groups of cycloconverter tubes are at different potentials, and these two cathode-circuits are shown as the terminal circuits 13' and 14', respectively, of the midtapped balancing-transformer 15. The midtap 16 of this balancing transformer thus constitutes the common positive direct-current output-terminal of the two groups of cycloconverter tubes, and the direct-current return-circuit, including the choke-coil 17, is connected between the midtap 16 and the secondary-winding neutral 48.

In Fig. 2, we have utilized ignitrons, illustrating the equivalence of a different kind of gas or vapor-filled tube, for the twelve tubes T1 to T6 and T1' to T6', instead of the hot-cathode gas-filled tubes of Fig. 1. There are several kinds of control-electrode arrangements for ignitrons. In the particular type of ignitron which is shown in Fig. 2, each tube has a mercury cathode 51, an ignitor 52, an exciting or auxiliary anode 53, one or more control-grids, in the form of shield-grids 4, and a main anode 54.

In Fig. 2, the control-grid 4 is utilized to initiate the firing of the respective tubes, and the control-circuits for the respective control-grids 4 are precisely the same as in Fig. 1, except for the fact that now there are two cathode-buses 13' and 14', necessitating the use of two negative biasing batteries 18 and 18', in place of the single negative biasing battery 19 in Fig. 1; and also, in Fig. 2, there are two modulator-batteries 56 and 56', in place of the single modulator-battery 26 of Fig. 1. Each modulator-battery 56 and 56' of Fig. 2 energizes its own modulator-commutator 21 and 21', respectively. Otherwise, the control-grid circuits of Fig. 2 are identical with the control-circuits already described in connection with Fig. 1, and no repetition of the description is considered necessary.

In Fig. 2, since the mercury cathodes 51 are not constantly excited, as in the case of the hot cathodes of Fig. 1, it is necessary to provide means for exciting the ignitor 52 of each of the main power-tubes T1 to T6 and T1' to T6', at an early stage of each positive half-wave of the anode-voltage applied to the tube, and to maintain a holding-circuit, auxiliary-anode excitation for a sufficient length of time, such as 120°, after the initial ignitor-excitation, to cover both the rectifier-operation and the inverter-operation of the tube. By such holding-circuit, auxiliary-anode excitation, we refer to the excitation which is provided by the auxiliary anode 53, which maintains a small arc within the tube, for a certain length of time during each cycle, so that the tube is excited. The tube does not fire, however, or become conducing, from its main anode 54 to the cathode 51, until the shield-grid 4 becomes sufficiently positive with respect to the cathode, under the operation of the grid-control circuit.

A conventional or known firing-control for the ignitor 52 and the auxiliary anode 53 of two of the main power tubes, T4 and T1' respectively, by way of example, is shown in Fig. 2, the remaining firing-control circuits being similar, but connected to their own phases. The ignitors 52 are excited from auxiliary transformers having a star-connected 6-phase secondary winding 61, the respective phases of which are utilized to energize the ignitors 52 of the main power-tubes, in pairs, through insulating transformers 62, each having two secondary windings 63.

Thus, referring to the auxiliary-transformer secondary 61, the phase-winding 64 is connected to the corresponding insulating transformer 62, through a variable phase-shifting reactor 65, and a saturating reactor 66, with an energy-storing capacitor 67 connected across the secondary winding 64, at a circuit-point between the variable reactor 65 and the saturating reactor 66. The variable reactor imposes a reactive impedance having a magnitude which is varied by means of a direct-current saturating-winding 68, which is variably excited from a direct-current source 69 and a variable rheostat 71. The function of the variable reactor 65 is to control the phase of the input-frequency cycle at which there is an effective excitation of the ignitor 52. The two secondary windings 63 of each insulating transformer 62 are connected to 180°-related ignitors 52 of two of the main power-tubes, one tube from one cycloconverter group, and the other tube from the other group, as exemplified by the tubes T4 and T1'. A rectifier 72 is included in each of the ignitor-circuits, in order to block out the negative peaks which appear in the output-voltage of the secondary windings 63 of the insulating transformers 62.

The auxiliary anodes 53 are energized, through current-limiting resistors 73, from the proper phases of two star-connected secondary windings 74 and 74' of an exciting transformer having a 3-phase primary winding 75 which is energized from the auxiliary input-frequency circuit 34.

The utilization of an output-frequency-modulated shield-grid means, in combination with an input-frequency-energized ignitor and an auxiliary-anode holding-circuit, is more generally described and claimed in an application of John L. Boyer, Serial No. 716,196, filed December 14, 1946.

In Fig. 3, we have shown a form of embodiment of our invention illustrating several variable features which may be included in lieu of corresponding features in Figs. 1 and 2, or in addition thereto.

In Fig. 3, we show a 3-phase input-circuit 81, which is energized from a generator 82. An eighteen-tube cycloconverter 83 is utilized to couple the input-circuit 81 to a 3-phase output-circuit 84A, 84B and 84C, having a lower frequency than the input-circuit. The cycloconverter-tubes 83 are illustrated as ignitron-tubes. They are arranged in six groups of three, numbered A1, A3, A5; A4, A6, A2; B1, B3, B5; B4, B6, B2; C1, C3, C5; and C4, C6, C2. These letters A, B and C of this nomenclature correspond to the three phases of the output-circuits 84A, 84B and 84C. The numbers correspond to the phase-numbers of a 6-phase system of vectors of the input-frequency.

The positive groups of cycloconverter-tubes 83 are those bearing odd numbers, such as the tubes A1, A3 and A5, which supply the positive half-waves of the phase-A output-current for the output-conductor 84A. These tubes are called the positive tubes because their anodes 85 are connected to the respective phase-conductors of the three-phase input-circuit 81. The mercury cathodes 86 of these positive tubes are connected to a common cathode-circuit 87A. The corresponding cathode-circuits for the other output-phases are designated 87B and 87C, respectively.

The so-called negative tubes 83 of the cycloconverter are designated by even numbers, such as the tubes A4, A6 and A2, which supply the negative halves of the output-currents in their respective output-phases, such as the output-phase 84A. The cathodes 86 of each group of these negative tubes are connected to the respective phase-conductors of the 3-phase input-circuit 81, while the anodes 85 of said negative tubes are connected to common anode-conductors 88A, 88B and 88C, respectively, for the three output-phases 84A, 84B and 84C.

As will be explained later on, each group of tubes, either positive or negative, is capable of supplying the entire voltage-wave of the output-phase to which it is connected. When the output-current is at unity displacement-factor, the positive half-waves of current are drawn from the positive tubes, through rectifier action, and the negative half-waves of the current are drawn from the negative tubes, also through rectifier action. However, an important characteristic feature of our cycloconverter is that the output-current does not need to be at unity displacement-factor, and when this is the case, the output-current is not in phase with the output-voltage, so that the part of the current which is out of phase with the voltage is supplied partly by rectifier action, and partly by inverter action.

This circumstance will be explained more in detail, with reference to wave-form diagrams, in the subsequent explanation of the mode of operation of the invention. It is mentioned, here, to emphasize the fact that when we refer to positive tubes and negative tubes, we use the terms "positive" and "negative" only as a convenience, to refer to currents which are considered to be positive or negative at any particular moment. It should be borne in mind, however, that each cycloconverter-tube 83 is capable of supplying both the positive and negative halves of the output-voltage wave, by reason of the control-circuit voltage which is supplied to each tube, as each cycloconverter-tube 83 is capable of operating either as a rectifier or as an inverter.

The 3-phase output-circuit 84A, 84B, 84C of Fig. 3 is illustrated as being utilized to energize a variable-speed 3-phase motor 90, which may be either an induction motor or a synchronous motor. It is illustrated as having a 3-phase primary winding 91, which is the stator winding of the machine, and it has a rotor 92 which is provided with a squirrel-cage secondary or damper winding 93, and it may or may not have a direct-current exciting-winding 94, which may be suitably controlled by automatic or manual means (not shown) as is well understood in the art of synchronous-motor operation.

Fig. 3 shows a novel method and means for transferring power from the positive and negative groups of cycloconverter tubes to the several output-phases 84A, 84B and 84C, and this particular method and means constitutes the subject-matter of a copending application of John L. Boyer, Serial No. 739,725, filed April 5, 1945.

The means for transferring power from the cycloconverter-groups to the load-circuit 84A, 84B and 84C is the same for each phase, so that a description of the means for one phase will suffice for all three. As shown in Fig. 3, this power-transfer means, for phase A, is in the form of a paralleling reactor 95A, which has a midtap which is connected to the corresponding output-phase 84A. The terminals of the paralleling reactor 95A are connected respectively to the cathode-bus 87A of the corresponding positive group of tubes, A1, A3, A5, and the anode-bus 88A of the corresponding negative groups of tubes, A4, A6, A2. The paralleling reactors for the other two output-phases are designated 95B and 95C, respectively.

It is sometimes desirable, as shown in Fig. 3, to provide output-circuit capacitors 96, 97 and 98, which are connected in shunt or delta across the various output-phases 84A, 84B and 84C, for the purpose of both assisting in correcting the power factor of the output-circuit, and also serving as a filter for absorbing some of the ripples of the output-circuit.

By way of illustrating a different form of tube-control, in Fig. 3, the cycloconverter tubes 83 are illustrated as ignitron tubes, and the only control-electrodes of these tubes are illustrated as being the ignitors 100 of the several tubes. The exciting currents for the several ignitors, as illustrated, are supplied, by a known form of exciter-circuit, indicated generally by the numeral 101, from eighteen gas-filled auxiliary or exciter-tubes 102, only seven of which are shown in Fig. 3, the rest having been omitted in order to avoid unnecessary complication of the diagram. Thus, we have illustrated the six auxiliary tubes 102 for exciting the ignitors of the six phase-A cycloconverter-tubes A1, A3, A5; A4, A6, A2, referring to the output-phase A of the output-circuit conductor 84A. The cycloconverter-tubes of the remaining two phases are similarly controlled, the nature of the control being indicated only for the first tube, BI, of the second output-phase, to show the nature of the connections.

The ignitor-energizing tubes 102 have control-grids 103 which are controlled in a manner similar to that which has been described for the control-circuits of Figs. 1 and 2. The cathodes 104 of all eighteen exciter-tubes 102 are connected to a common cathode-circuit or bus 105, to which is connected a grid-control circuit 106 which includes a negative bias-battery 107, and a conductor 108 which then branches into six branch control-circuits 109A, 109A', 109B, 109B', 109C and 109C'. One of these branch control-circuits is utilized for the three cycloconverter-tubes 83 of each of the six groups of cycloconverter-tubes. The control-circuit branches for the positive cycloconverter-groups are not primed, and control-circuit branches for the negative cycloconverter-groups are primed.

Each of the control-circuit branches 109A, etc., includes a source of a square-topped modulator-wave voltage, and since these six modulator-wave sources are similar, a description of one will suffice for all. These modulator-wave sources are indicated as comprising six rotating commutators 111A, 111A', 111B, 111B', 111C, 111C', each of which has two insulated conducting segments 112 and 113, of approximately 180 electrical degrees in extent, energized from its own battery 114 or other source of direct-current voltage. The relative phases, or circumferential positions, of the conducting segments 112 and 113, with respect to the phase-positions, or circumferential positions, of the brushes 115 which bear thereon, are adjusted in accordance with the relative phases of the output-voltages which are desired in the six groups of cycloconverter-tubes 83.

The six modulator-frequency commutators 111A, etc., are mounted on a common shaft 116, which is driven at the synchronous speed corresponding to the desired output-frequency of the output-circuit 84A, 84B and 84C. Any suitable means may be utilized for furnishing the driving-energy for rotating this commutator-shaft 116. In Fig. 3, since the main motor 90 is a synchronous motor, the commutator-shaft 116 has been indicated as being connected directly to the rotor-member 92 of this motor. If it is desired to cause the motor-speed to either increase or decrease, this action may be accomplished by means of a reversible pilot-motor 117, which drives a plurality of worm-gears 118, which mesh with worm-gears 119 which serve as brushholder-supporting rocker-rings for the respective modulator-commutators 111A, 111A', etc., so that the brush-positions of all of the modulator-commutators may be advanced or retarded, in unison. The reversible pilot-motor 117 is illustrated as having two field-windings 121 and 122, of opposite polarity, either one of which may be energized by suitable control-means, either manual or automatic, symbolically indicated by push buttons 123 and 124.

Continuing the description of grid-control branch-circuits 109A, 109A', 109B, 109B', 109C and 109C', as shown in Fig. 3, it will be noted that the two branch-circuits 109A and 109A', for controlling the positive and negative tubes of the output-phase A, are continued, from the modulator-commutators 111A and 111A', through circuit-conductors 125A and 125A', respectively, to the midpoints of two groups of 3-phase star-connected secondary windings 126A and 126A', which are energized from a group of 3-phase-connected primary windings 127A of three peaking-transformers, for supplying the grid-controlling voltage-peaks for controlling the rectifier-operation of the corresponding cycloconverter-tubes 83. The corresponding phases of the rectifier-peaker windings 126A and 126A' are connected to the proper phases of a group of open-star 6-phase-connected secondary windings 128A which are excited by a group of 3-phase-connected primary windings 129A of three peaking-transformers for supplying the grid-controlling voltage-peaks for the inverter-operation of the respective cycloconverter-tubes 83.

The corresponding peaking-transformers for the output-phase B are indicated at 127B and 129B. The corresponding peaking-transformers for the third phase C have been omitted from Fig. 3, for clarity of illustration, in order to avoid unnecessary complication of the drawing.

The two groups of "rectifier" peaking-transformers 127A and 127B, and the unillustrated third one, which would be 127C, are illustrated as being excited from a 3-phase input-frequency circuit 131, the phase of which is controlled by means of a phase-shifter 132 which is excited from an auxiliary input-frequency circuit 133, energized, through an auxiliary power-transformer 134, from the 3-phase input-circuit 81 of the cycloconverter. The three groups of "inverter" peaking transformers 129A, etc., are excited from a 3-phase input-frequency circuit 135, which is energized, by a phase-shifter 136, from the auxiliary input-frequency circuit 133. The phases of the secondary circuits of the peaking-transformers will be understood from the description given in connection with Fig. 1.

Tracing the grid-control circuit for controlling the first cycloconverter-tube A1, for example, and starting with the branch-circuit conductor 125A, it will be noted that the rectifier-peaker winding 137, having a phase corresponding to the voltage-phase which is supplied to the main tube A1, is connected in series with the inverter-peaker phase 138, which preferably lags 120° behind the winding 137, although the relative phases may be controlled, to a nicety, by the respective phase-shifters 132 and 136. The output-terminal of the inverter-peaker phase 138 is connected to the grid-circuit 139 of the auxiliary tube 102 which excites the ignitor 100 of the cycloconverter-tube A1.

The ignitor-circuits of the cycloconverter-tubes 83 in Fig. 3 are energized from the anode-circuits 141 of the respective auxiliary tubes 102. These anode-circuits are energized from a set of 6-phase star-connected secondary windings 142A, 142B, etc., of exciter-transformers which are illustrated as having 3-phase primary windings 143 energized from the auxiliary input-frequency bus 133.

The anode-circuit 141 of each of the auxiliary tubes 102 includes a rectifier 144 for delivering only the positive half-waves of the energizing-transformer phase, a current-limiting resistor 145, and the primary winding of an insulating transformer 146, the secondary winding of which excites the ignitor-circuit 147, through a rectifier 148 which supplies only the positive peaks to the ignitor. A return-path for the flux-decay current of the insulating transformer 146 is provided, in a known manner, by means of a rectifier 149 which is connected across the transformer-secondary.

The energy-source for each of the anode-circuits 141 of the auxiliary or exciting tubes 102 also includes an energy-storing capacitor 150 which is connected in shunt across the anode-circuit, as a point between the resistor 145 and the insulating transformer 146. The capacitor 150 assists in delivering a strong peak-current to the ignitor-circuit when the auxiliary tube 102 becomes conducting. The current-limiting resistor 145 controls the rate at which the capacitor 150 is charged, during the positive half-cycles of the anode-voltage which is applied to the tube 102, and the resistor 145 also serves to limit the amount of current which is drawn from the transformer-windings 142A, etc., when the auxiliary tube 102 becomes conducting.

The operation of our invention will best be understood with reference to the curve-diagrams of Figs. 4 to 12.

Fig. 4 shows the four control-voltages which are applied, in series with each other, to one of the cycloconverter-tubes, such as the grid-circuit of the tube T4 in Fig. 2. The rectifying peaks of the connected phase of the rectifier-peaker windings 30 of Fig. 2 are shown at 151 in Fig. 4; the inverting peaks of the connected phase of the windings 37 of Fig. 2 are shown at 152 in Fig. 4; the negative direct-current bias of the battery 59 of Fig. 2 is shown at 153 in Fig. 4; and the square-topped output-frequency modulator-wave of the commutator 21 of Fig. 2 is shown at 154 in Fig. 4. The rectifying and inverting peaks 151 and 152 are at the input-frequency. One complete cycle of the input-frequency is represented, in Fig. 4, by the horizontal distance between two similar peaks such as 155 and 156. When the four voltages 151, 152, 153 and 154 are added in series, the resultant voltage, which is applied to the grid 4 of the tube T4 of Fig. 2, for example, is as shown by the curve 157 in Fig. 5.

Figs. 6 and 8 show the sinusoidal voltages E1 to E6 which are supplied to the cycloconverter-tubes by the six-phase secondary transformer-winding 46 of Fig. 2; the zero-voltage line 0 of Figs. 6 and 8 being the voltage of the neutral point 48 of said winding 46. In Fig. 6, the heavy-line curve 158 shows substantially the voltage of the cathode-bus 13' of the so-called positive group of cycloconverter-tubes, T1 to T6, in Fig. 2, with respect to the voltage of the neutral conductor 48. In Fig. 8, the heavy-line curve 159 shows substantially the voltage of the cathode-bus 14' of the so-called negative group of cycloconverter-tubes, T1' to T6', in Fig. 2, with respect to the voltage of the neutral conductor 48. The voltage of the output-circuit 2 of Fig. 2 is the difference between the voltages represented by the heavy-line curves 158 and 159 of Figs. 6 and 8, and this output-voltage is shown, on a reduced voltage-scale, in Fig. 10, by the line 160.

In Fig. 7 are shown all of the resultant voltages which are applied to all of the control-circuits of the so-called positive group of tubes, T1 to T6, in Fig. 2. The zero-potential line 0, in Fig. 7, represents the potential of the cathode-bus 13' in Fig. 2. The positive rectifying-peaks of the control-circuits of the respective tubes are shown at R1 to R6 in Fig. 7, and the positive inverting-peaks of the control-circuits of the respective tubes T1 to T6 are shown at I1 to I6 in Fig. 7. The negative peaks of the grid-control voltages have been omitted, in Fig. 7, because they are immaterial, as the grid-circuits become effective to fire the several tubes T1 to T6, only when the respective grids obtain a voltage which is more positive than a certain critical grid-potential, such as is represented by the dotted horizontal line 161 in Fig. 7. It will be understood that the control-circuit of each tube, for example the tube T4, receives only the correspondingly numbered peaks R4 and I4 of its own circuit.

Fig. 9 shows all of the resultant grid-voltages which are applied to the so-called negative groups of tubes, T1' to T6' in Fig. 2, the peaks being correspondingly numbered, with prime-marks added, to distinguish the negative group from the positive group.

It will be noted, from Figs. 7 and 9, that the magnitude of the direct-current bias and the magnitude of the square-topped modulator-wave are such that the positive rectifier-firing peaks R1, etc., extend above the critical grid-voltage 161 when the modulator-voltage is positive, while failing to extend above the critical grid-voltage 161 when the modulator-voltage is negative. It will further be seen that the inverting-controlling peaks I1, etc., are larger than the rectifying-controlling peaks R1, etc., and that the inverter-controlling peaks always extend above the critical grid-voltage 161, whether the modulator-voltage is positive or negative.

To understand the operation of the cycloconverter-tubes in Fig. 2, we may refer to the positive half of the second voltage-wave in Fig. 6, (this wave being marked E2), and we may assume that the corresponding cycloconverter-tube T2 is carrying current, at the moment, as a rectifier, as indicated by the portion of the heavy-line curve which is indicated at 162. At a time indicated by the point 163, in Fig. 6, the next voltage-wave E3 crosses the wave E2, so that the anode 54 of the next tube T3, in Fig. 2, thereafter becomes more positive than the cathode-bus 13' of Fig. 2, (or the heavy-line curve 158 in Fig. 6), because the tube T2 continues to carry current for a while, as indicated by the portion of the heavy-line curve which is marked 164 in Fig. 6.

At a time represented by the point 165 in Fig. 7, the tube T3 of Fig. 2, receives a sufficiently positive grid-control voltage to fire said tube, and said tube thereupon fires, since its anode-voltage is more positive than its cathode-voltage, as just pointed out. A certain commutating time thereupon ensues, as represented by the horizontal distance between the vertical lines 165 and 166, in Fig. 6, during which time the current is commuted, or changed, from the tube T2 to the tube T3. The length of this commutating time depends upon the amount of current which has to be commutated at that particular moment, the leakage-reactance of the power-transformer winding 46, and the voltage-difference between the circuits being commutated. The voltage of the cathode-circuit 13' of Fig. 2 thereupon changes substantially to the voltage E3 which is supplied to the tube T3, as indicated by the portion of the heavy curve designated by the numeral 167 in Fig. 6.

Soon after the rectifying-firing peak R3 of the tube T3 occurs, as shown in Fig. 7, the inverting-firing peak I1 of the tube T1 occurs, but the tube T1 does not fire at this point, because its anode-voltage E1, as shown in Fig. 6, is more negative than its cathode-voltage which is shown by the portion 167 of the heavy-line curve in Fig. 6.

Before the time comes for the next following tube T4 to be energized as a rectifier, the modulator-voltage becomes negative, as indicated by the vertical line 168 in Fig. 7. Consequently, the tube T3 remains conducting until the inverting peak I4 is applied to the aforesaid following tube T4, as indicated by the instant of time represented by the point 168 in Fig. 7. During this time-interval, the voltage E3, which is applied to the anode of tube T3 of Fig. 2, crosses the zero-potential line 0, in Fig. 6, at the point indicated at 170, and the tube T3 thereafter remains excited, in the negative portion of the voltage-cycle, corresponding to inverter-operation. Whether the tube is actually carrying a load current, (as distinguished from the magnetizing current for the mid-tapped transformer 15), depends upon whether the current drawn by the load-circuit 2 is lagging with respect to the voltage which is applied to said load-circuit, as will be subsequently pointed out. In any event, the tube T3 remains in its excited or fired condition, ready to conduct current if any current is demanded by the load, in this inverter-operation portion of the voltage-wave E3, following the zero point 170 in Fig. 6.

At the point 169 of Fig. 7, when the control-circuit of the tube T4 of Fig. 2 becomes effectively excited, a firing-voltage is applied to the control-circuit of the tube E4, and said tube accordingly fires, because the anode-voltage of the tube, as represented by the dotted voltage-wave E4, in Fig. 6, is more positive than the cathode-voltage of the tube, as represented by the portion of the heavy line which is indicated at 171 in Fig. 6. After a certain commutating-time, as before, the current is transferred from the tube T3 to the tube T4, this operation being completed at the time indicated by the point 172 in Fig. 6.

In order that the anode-voltage of the tube T4 may be positive with respect to the cathode, at the inverter-firing point 169, it is necessary that this inverter-firing-point be timed so that it precedes the crossing point or crossover-instant represented by the point 173 in Fig. 6, when the negative half of the E4 voltage-wave crosses the negative half of the E3 voltage-wave in Fig. 6. It is further necessary that the inverter-firing time 169 shall precede said crossing-point 173 by a sufficiently wide margin to allow sufficient commutating-time 169—172 to commutate the heaviest currents the cycloconverter might ever be called upon to carry, at this moment. Otherwise, the commutating-operation would not be completed by the voltage-crossing time represented by the point 173 in Fig. 6, and the tube E3 would continue to be conducting, thus imposing a short-circuit on the supply-line 1. A certain deionizing-time 172—173 must also be allowed, as will be subsequently explained.

Assuming that the inverter-firing points are timed or phased to be sufficiently in advance of the 6-cycle voltage-crossing points 173, as just described, this inverter-operation continues, with the conductive operation of the positive group of cycloconverter-tubes transferred from one tube to the next, until the modulator-voltage again becomes positive, as indicated at 174 in Fig. 7. The next rectifier-firing peak thereupon becomes effective to fire its associated tube. In Fig. 7, this next rectifier-peak is the peak R5, for the tube T5 of Fig. 2. This peak R5 thereupon fires the tube T5, because the anode-voltage of said tube, as represented by the voltage-wave E5 and the numeral 175 in Fig. 6, is more positive than the cathode-voltage of that tube, as represented by the heavy-line portion of the negative half of the voltage-wave E2, which is indicated at 176 in Fig. 6. The rectifier-operation of the tubes of the positive group, T1 to T6 (Fig. 2), is thereupon initiated, and is continued until the cycle is repeated, as previously explained.

It will be noted, from Figs. 8 and 9, that the negative group of tubes, T1' to T6' of Fig. 2, operate in precisely the same way as the positive group, except that the modulator-wave, for the negative group, is negative when it is positive for the positive group, and it is positive for the negative group when it is negative for the positive group.

The output-voltage, as previously noted, has a wave-form as shown, in Fig. 10, by the curve 160. The output-current may be anything, either in phase with the voltage, for unity-power-factor or resistance-loading, or 180° out of phase with the voltage, for unity-power-factor feed-back, from the output-circuit 2 to the input-circuit 1 of Fig. 2, or in any intermediate phase-position, either leading or lagging. The cycloconverter stands ready, at every instant, to supply current, in either direction, whatever may be the output-circuit demand.

The angular distance between the rectifying point 165 in Fig. 7, and the preceding 6-phase voltage-crossing point 163 in Fig. 6 (assuming 6-phase rectifier-operation, as in Fig. 2), is called the delay-angle for the rectifier-peak, or the rectifying delay-angle, expressed in terms of the input-frequency. In like manner, the phase or time-delay, expressed in terms of input-frequency degrees, between the inverter firing-point 177 of the same tube and the same voltage-crossing point 163, is called the delay-angle for the inverter peak, or the inverter delay-angle.

There is a phenomenon which is dependent upon the relation between the rectifier delay-angle 163—165, in Fig. 6, and the inverter advance-angle 177—178, where 178 is the next voltage-crossing point, 180° after the crossing-point 163. The inverter advance-angle 177—178 is equal, of course, to 180° minus the inverter delay-angle 163—177.

The effective magnitude of the output-voltage with respect to the input-voltage may be varied, from a maximum to zero, by increasing the rectifying delay-angle 163—165 from the smallest reasonable value to approximately 90°, or approximately the time represented by the horizontal distance 163—179 in Fig. 6, and simultaneously reducing the inverting delay-angle 163—177, preferably in approximately the same amount, of from 163—177 to 163—179. If the rectifying and inverting phase-angles are changed in equal amounts in opposite directions, when either one is changed, the two phase-shifters 132 and 136 may be mechanically coupled together, with one of them connected in the opposite phase-sequence with respect to the other, as has been indicated in Fig. 3, wherein the two phase-shifters 132 and 136 are shown as being mounted on a common control-shaft 180.

The minimum practicable inverting advance-angle, such as 169—173 or 177—178 in Fig. 6, and hence the minimum practicable rectifying-delay-angle, such as 163—165 of Fig. 6, is of the order of 12 to 30 degrees. The limit is reached when the end of the inverting delay-angle, such as 163—177, approaches so closely to the voltage-crossing point 178 (Fig. 6), for that phase, that the end of the inverting commutating-angle, such as is shown, for a different phase, at 169—172, will approach toward the next voltage-wave crossing-point 173, with an insufficient margin of safety.

It is necessary for a certain deionizing time to occur, between the point when the inverter-commutation has been completed, as indicated at 172 in Fig. 6, and the next voltage-crossing point 173, to allow the inverting tube to become deionized. In other words, referring to the tube T3 which was inverting before the commutating operation 169—172, it is necessary for this commutating operation to be completed, so as to make said tube nonconducting, a certain finite time before the next voltage-crossing point 173 is reached, that is, before the anode-voltage, E3, of the previously inverting tube T3 becomes positive with respect to its cathode-voltage E4, which is substantially the same as the anode-voltage, E4, of the newly fired tube T4. The space within said previously firing tube T3 must first become deionized.

The duration of the inverter commutating-time, such as 169–172 of Fig. 6, is dependent upon the out-of-phase load-current at the moment the voltage-difference between the circuits being commutated, and the leakage-reactance of the input-transformer such as the transformer-secondary 46 of Fig. 2. If this input-transformer has a very low leakage, a larger inverting delay-angle 163–177 may be used with the same load-current, and still have a long enough deionizing-time before the 180° delay-point 173 is reached.

While the immediately preceding discussion has had to do with 6-phase converter-operation, in which the crossing-points of the successive voltage-waves are 60° apart, as shown in Figs. 6 and 8, the same principles apply to 3-phase operation, such as would be obtained with the circuit shown in Fig. 3, with the understanding that the voltage-wave crossing-points, with respect to which the rectifier and inverting delay-angles are measured, would be the crossing-points of three sinusoidal waves, spaced 120° apart, rather than six sinusoidal waves, spaced 60° apart.

It should also be understood that the effect of the choke-coil 17, and other reactance-effects of the circuit, would be to somewhat smooth out the ripples of the effective voltage-wave which is actually applied to the output-circuit, the curve 160 of Fig. 10 being a theoretical curve in which no effort has been made to evaluate the magnitude of the damping effect of the choke-coil 17 of Figs. 1 and 2.

It should also be understood that our cyclo-converter-circuit is of general utility, capable of useful application for purposes other than the specific purpose of interchanging power, in either direction, between an alternating-current input-circuit, either single-phase or polyphase, and an alternating-current output-circuit, either single-phase or polyphase.

For example, in Fig. 1 or Fig. 2, instead of developing a large voltage in the output-transformer 15, and withdrawing energy therefrom, while having only a relatively small voltage and a relatively small current in the direct-current return-circuit represented by the choke coil 17, we could withdraw no power from the output-transformer 15 nor from the output-circuit 2, and we could withdraw all of the useful output energy from the direct-current circuit, regarding the choke coil 17 as a symbolic representation of a direct-current energy-translating device, either a load-device for withdrawing power from the 3-phase circuit 1, or a generating device for supplying power back into the 3-phase circuit 1. In either event, our novel cycloconverter-combination is particularly effective because of the fact that the positive group or groups of converter-tubes are capable of operating first as a rectifier and then as an inverter, in successive portions of the modulator-frequency cycle, while the negative group or groups of converter-tubes are capable of operating concurrently first as inverters and then as rectifiers during the aforesaid successive portions of the modulator-frequency cycle.

When no alternating-current load is taken off of the output-transformer 15 of Fig. 1 or 2, the modulator-frequency is largely immaterial, so far as the direct-current load-circuit 17 is concerned, and the only effect of the modulator-frequency is to determine the lengths of the times during which the converter-groups alternately rectify and invert. The smallest permissible modulator-frequency, under these conditions, is determined by the length of the period during which a heavy overload can be carried by one converter-group before it has to be relieved (to prevent failure) by transferring the overload, temporarily, to the other converter-group.

While we have described our input-frequency control-circuit transformers as peaking-transformers, 30, 37, 128A, 128A, etc., and while, in general, we prefer to utilize peaking-transformers, it is not necessary for both the rectifying-firing input-frequency control-circuit voltage and the inverting-firing input-frequency control-voltage to be in the form of peaks. Peaked positive rectifier-firing and inverter-firing voltage-waves 151 and 152 are desirable, as shown in Fig. 4, because these voltages are added to each other, and are out of phase with each other, so that each peaking-transformer produces little or no voltage at the time when the peak occurs on the other peaking-transformer. Peaked grid-control firing-voltages are desirable, also, because of the accuracy of control of the rectifying and inverting firing-points which are thereby obtained, independently of any variations or differences in the precise critical grid-voltages 161 (Figs. 7 and 9) of the various tubes.

Fig. 11 shows a form of embodiment of our invention in which the rectifying-firing input-frequency control-circuit voltage of any one of the converter-tubes is a sine wave, as indicated at 182, rather than peaks as shown at 151 in Fig. 4. This simply means that the rectifying peaking-transformer 30 (Fig. 1), for example, is not peaking or saturating. In Fig. 11, the two input-frequency control-circuit voltages 182 and 152 are plotted with respect to the negative bias 153, instead of with respect to the zero-voltage line 0, as in Fig. 4.

In like manner, while we have described the modulator-voltage as being approximately square-topped, which is the preferable arrangement, a modulator-voltage of other wave-form could be utilized, such as the sinusoidal modulator-frequency voltage 183 of Fig. 12.

When the output-circuit of the cycloconverter is utilized to energize a motor 90 which is provided with a damper winding or short-circuited squirrel-cage secondary winding 93, as shown in Fig. 3, experience has shown that the motor is quite capable of performing satisfactorily on an output-wave-form having strong harmonics in it, either when the harmonics result from the blocked or square-topped form of the output-voltage of the cycloconverter, in the output-circuit 84A, 84B, 84C of Fig. 3, or when the harmonics result from ripples which produce harmonics in the output-voltage wave. This is so, because the motor damping-winding 93 substantially blocks the harmonics from the wave-form of the flux of the motor, resulting in only a moderate increase in the heating of the motor because of the harmonics in the voltage which is supplied to the motor.

When the displacement-factor of the load on the output circuit 2 of Fig. 1 or 2, or on the output-circuit 84A, 84B, 84C of Fig. 3, is substantially unity, and can be maintained surely at unity, without risk of having any substantial wattless-current component, then it is not necessary for the inverter-controlling peakers to be used in our control-circuits, such as are shown at 37 in Figs. 1 and 2, and at 128A in Fig. 3, and these inverter-controlling peakers could then be either omitted entirely, or cut out of circuit during the unity-displacement-factor operation. A significant feature of our invention, however, lies in the fact that the inclusion of these inverter-controlling peakers makes it possible to supply an output-circuit load which is not at unity-displacement-factor, either during the motor-starting period, or under fault-conditions, or even during normal operating conditions.

While we have described our invention in several different forms of embodiment, which now seem to be preferable, and while we have explained our present understanding of the nature and operation of the invention, we wish it to be understood that we are not altogether limited to the particular forms of embodiment, or explanations, which we have given. We desire, therefore, that the appended claims shall be accorded the broadest construction consistent with their language.

We claim as our invention:

1. An electronic converter comprising one or more pairs of positive and negative groups of tubes, each tube having a control-circuit, and having a main anode-and-cathode circuit which has a tendency to become conducting whenever the tube is fired by having its control-circuit become sufficiently positive to attain at least a critical tube-firing control-voltage with respect to its cathode at a time when its anode is sufficiently positive with respect to its cathode, each tube and its control-circuit being so related and arranged that the tube, when fired, thereafter has a tendency to remain conducting as long as its anode remains sufficiently positive with respect to its cathode; an alternating-current input-circuit associated with the tubes for supplying input-frequency energy to the tubes or receiving input-frequency energy from the tubes; each group of tubes having a common output-terminal; and control-circuit excitation-means for exciting the control-circuits of the respective tubes, said control-circuit excitation-means including means for producing a control-voltage modulation at the input-frequency, and means for producing a control-voltage modulation at a modulator-frequency which is less than said input-frequency, said modulator-frequency control-circuit excitation-means comprising the combination of a direct-current bias-voltage source and a circuit-make-and-break device associated therewith for producing a modulator-frequency voltage-modulation having a substantially square-topped wave form.

2. An electronic converter comprising one or more pairs of positive and negative groups of tubes, each tube having a control-circuit, and having a main anode-and-cathode circuit which has a tendency to become conducting whenever the tube is fired by having its control-circuit become sufficiently positive to attain at least a critical tube-firing control-voltage with respect to its cathode at a time when its anode is sufficiently positive with respect to its cathode, each tube and its control-circuit being so related and arranged that the tube, when fired, thereafter has a tendency to remain conducting as long as its anode remains sufficiently positive with respect to its cathode; an alternating-current input-circuit associated with the tubes for supplying input-frequency energy to the tubes or receiving input-frequency energy from the tubes; each group of tubes having a common output-terminal; a mid-tapped winding joining the output-terminals of the positive and negative groups of a pair of groups; and a plurality of control-circuit voltage-sources for exciting the control-circuits of the respective tubes, said control-circuit voltage-sources serially including two input-frequency voltage-sources of different voltages individual to each tube, the lower-voltage input-frequency source having positive voltage-waves timed suitably for initiating a rectifying operation of the tube to which it is applied, the higher-voltage input-frequency source having positive voltage-waves timed suitably for initiating an inverting operation of the tube to which it is applied, at least one of said lower-voltage or higher-voltage input-frequency control-circuit waves being peaked, and tube-controlling means including a common modulator-frequency variable-voltage means, common to all of the tubes of a group, each modulator-frequency tube-controlling means alternating between a tube-controlling voltage such that the positive voltage-waves of both the rectifying and inverting input-frequency control-circuit sources are permitted to fire their respective tubes if the anodes are sufficiently positive with respect to the cathodes, and a tube-controlling voltage which blocks the rectifying but not the inverting, input-frequency control-circuit sources from firing their respective tubes, at a modulator-frequency which is different from said input-frequency, the modulator-frequency voltage-variation for the positive group of a pair of groups being substantially in the middle of a firing-permitting voltage-condition with the modulator-frequency voltage-variation for the negative group of said pair of groups is substantially in the middle of a blocking condition.

3. An electronic converter comprising one or more pairs of positive and negative groups of tubes, each tube having a control-circuit, and having a main anode-and-cathode circuit which has a tendency to become conducting whenever the tube is fired by having its control-circuit become sufficiently positive to attain at least a critical tube-firing control-voltage with respect to its cathode at a time when its anode is sufficiently positive with respect to its cathode, each tube and its control-circuit being so related and arranged that the tube, when fired, thereafter has a tendency to remain conducting as long as its anode remains sufficiently positive with respect to its cathode; an alternating-current input-circuit associated with the tubes for supplying input-frequency energy to the tubes or receiving input-frequency energy from the tubes; each group of tubes having a common output-terminal; a midtapped winding joining the output-terminals of the positive and negative groups of a pair of groups; and a plurality of control-circuit voltage-sources for exciting the control-circuits of the respective tubes, said control-circuit voltage-sources serially including two input-frequency voltage-sources of different voltages individual to each tube, the lower-voltage input-frequency source having positive voltage-waves timed suitably for initiating a rectifying operation of the tube to which it is applied, the higher-voltage input-frequency source having positive voltage-waves timed suitably for initiating an inverting operation of the tube to which it is applied, at least one of said lower-voltage or higher-voltage input-frequency control-circuit waves being peaked, and said control-circuit voltage-sources further serially including a common modulator-frequency variable-bias means, common to all of the tubes of a group, each variable-bias means alternating between a bias of such strength that the positive voltage-waves of both the rectifying and inverting input-frequency control-circuit sources make their respective control-circuits reach the critical tube-firing-control-voltage, and a more negative bias which blocks the rectifying, but not the inverting, input-frequency control-circuit sources from making their respective control-circuits reach the critical tube-firing control-voltage, at a modulator-frequency which is different from said input-frequency, the modulator-frequency bias-variation for the positive group of a pair of groups being substantially in the middle of a high-negative-bias condition when the modulator-frequency bias-variation for the negative group of said pair of groups is substantially in the middle of a low-negative-bias condition.

4. The invention as defined in claim 2, characterized by said modulator-frequency being lower than said input-frequency.

5. The invention as defined in claim 3, characterized by said modulator-frequency being lower than said input-frequency.

6. The invention as defined in claim 2, characterized by said modulator-frequency variable-voltage means having a substantially square-topped wave-form.

7. The invention as defined in claim 3, characterized by said modulator-frequency variable-bias means having a substantially square-topped wave-form.

8. The invention as defined in claim 2, characterized by said modulator-frequency variable-voltage means having a substantially square-topped wave-form, and further characterized by said modulator-frequency being lower than said input-frequency.

9. The invention as defined in claim 3, characterized by said modulator-frequency variable-bias means having a substantially square-topped wave-form, and further characterized by said modulator-frequency being lower than said input-frequency.

10. An electronic frequency-changer comprising one or more pairs of positive and negative groups of tubes, each tube having a control-circuit, and having a main anode-and-cathode circuit which has a tendency to become conducting whenever the tube is fired by having its control-circuit become sufficiently positive to attain at least a critical tube-firing control-voltage with respect to its cathode at a time when its anode is sufficiently positive with respect to its cathode, each tube and its control-circuit being so related and arranged that the tube, when fired, thereafter has a tendency to remain conducting as long as its anode remains sufficiently positive with respect to its cathode; an alternating-current input-circuit associated with the tubes for supplying input-frequency energy to the tubes or receiving input-frequency energy from the tubes; each group of tubes having a common output-terminal; a midtapped winding joining the output-terminals of the positive and negative groups of a pair of groups; a modulator-frequency output-circuit operatively associated with said midtapped winding; and a plurality of control-circuit voltage-sources for exciting the control-circuits of the respective tubes, said control-circuit voltage-sources serially including two input-frequency voltage-sources of different voltages individual to each tube, the lower-voltage input-frequency source having positive voltage-waves timed suitably for initiating a rectifying operation of the tube to which it is applied, the higher-voltage input-frequency source having positive voltage-means timed suitably for initiating an inverting operation of the tube to which it is applied, at least one of said lower-voltage or higher-voltage input-frequency control-circuit waves being peaked, and tube-controlling means including a common modulator-frequency variable-voltage means, common to all of the tubes of a group, each modulator-frequency tube-controlling means alternating between a tube-controlling voltage such that the positive voltage-waves of both the rectifying and inverting input-frequency control-circuit sources are permitted to fire their respective tubes if the anodes are sufficiently positive with respect to the cathodes, and a tube-controlling voltage which blocks the rectifying, but not the inverting, input-frequency control-circuit sources from firing their respective tubes, at a modulator-frequency which is different from said input-frequency, the modulator-frequency voltage-variation for the positive group of a pair of groups being substantially in the middle of a firing-permitting voltage-condition when the modulator-frequency voltage-variation for the negative group of said pair of groups is substantially in the middle of a blocking condition.

11. An electronic frequency-changer comprising one or more pairs of positive and negative groups of tubes, each tube having a control-circuit, and having a main anode-and-cathode circuit which has a tendency to become conducting whenever the tube is fired by having its control-circuit becomes sufficiently positive to attain at least a critical tube-firing control-voltage with respect to its cathode at a time when its anode is sufficiently positive with respect to its cathode, each tube and its control-circuit being so related and arranged that the tube, when fired, thereafter has a tendency to remain conducting as long as its anode remains sufficiently positive with respect to its cathode; an alternating-current input-circuit associated with the tubes for supplying input-frequency energy to the tubes or receiving input-frequency energy from the tubes; each group of tubes having a common output-terminal; a midtapped winding joining the output-terminals of the positive and negative groups of a pair of groups; a modulator-frequency output-circuit operatively associated with said midtapped winding; and a plurality of control-circuit voltage-sources for exciting the control-circuits of the respective tubes, said control-circuit voltage-sources serially including two input-frequency voltage-sources of different voltages individual to each tube, the lower-voltage input-frequency source having positive voltage-waves timed suitably for initiating a rectifying operation of the tube to which it is applied, the higher-voltage input-frequency source having positive voltage-waves timed suitably for initiating an inverting operation of the tube to which it is applied, at least one of said lower-voltage or higher-voltage input-frequency control-circuit waves being peaked, and said control-circuit voltage-sources further serially including a common-modulator-frequency variable-bias means, common to all of the tubes of a group, each variable-bias means alternating between a bias of such strength that the positive voltage-waves of both the rectifying and inverting input-frequency control-circuit sources make their respective control-circuit reach the critical tube-firing control-voltage, and a more negative bias which blocks the rectifying, but not the inverting, input-frequency control-circuit sources from making their respective control-circuits reach the critical tube-firing control-voltage, at a modulator-frequency which is different from said input-frequency, the modulator-frequency bias-vibration for the positive group of a pair of groups being substantially in the middle of a high-negative-bias condition when the modulator-frequency bias-variation for the negative group of said pair of groups is substantially in the middle of a low-negative-bias condition.

12. The invention as defined in claim 10, characterized by said modulator-frequency being lower than said input-frequency.

13. The invention as defined in claim 11, characterized by said modulator-frequency being lower than said input-frequency.

14. An electronic converter comprising one or more pairs of positive and negative groups of tubes, each tube having a control-circuit, and having a main anode-and-cathode circuit which has a tendency to become conducting whenever the tube is fired by having its control-circuit become sufficiently positive to attain at least a critical tube-firing control-voltage with respect to its cathode at a time when its anode is sufficiently positive with respect to its cathode, each tube and its control-circuit being so related and arranged that the tube, when fired, thereafter has a tendency to remain conducting as long as its anode remains sufficiently positive with respect to its cathode; an alternating-current input-circuit associated with the tubes for supplying input-frequency energy to the tubes or receiving input-frequency energy from the tubes; means for providing a common positive terminal and a common negative terminal for the two groups of a pair of groups of tubes, one of said positive or negative terminals being the midtap of a midtapped winding; a direct-current circuit connected between said positive and negative terminals; and a plurality of control-circuit voltage-sources for exciting the control-circuits of the respective tubes, said control-circuit voltage-sources serially including two input-frequency voltage-sources of different voltages individual to each tube, the lower-voltage input-frequency source having positive voltage-waves suitably for initiating a rectifying operation of the tube to which it is applied, the higher-voltage input-frequency source having positive voltage-waves timed suitably for initiating an inverting operation of the tube to which it is applied, at least one of said lower-voltage or higher-voltage input-frequency control-circuit waves being peaked, and tube-controlling means including a common modulator-frequency variable-voltage means, common to all of the tubes of a group, each modulator-frequency tube-controlling means alternating between a tube-controlling voltage such that the positive voltage-waves of both the rectifying and inverting input-frequency control-circuit sources are permitted to fire their respective tubes if the anodes are sufficiently positive with respect to the cathodes, and a tube-controlling voltage which blocks the rectifying, but not the inverting, input-frequency control-circuit sources from firing their respective tubes, at a modulator-frequency which is different from said input-frequency, the modulator-frequency voltage-variation for the positive group of a pair of groups being substantially in the middle of a firing-permitting voltage-condition when the modulator-frequency voltage-variation for the negative group of said pair of groups is substantially in the middle of a blocking condition.

15. An electronic converter comprising one or more pairs of positive and negative groups of tubes, each tube having a control-circuit, and having a main anode-and-cathode circuit which has a tendency to become conducting whenever the tube is fired by having its control-circuit become sufficiently positive to attain at least a critical tube-firing control-voltage with respect to its cathode at a time when its anode is sufficiently positive with respect to its cathode, each tube and its control-circuit being so related and arranged that the tube, when fired, thereafter has a tendency to remain conducting as long as its anode remains sufficiently positive with respect to its cathode; an alternating-current input-circuit associated with the tubes for supplying input-frequency energy to the tubes or receiving input-frequency energy from the tubes; means for providing a common positive terminal and a common negative terminal for the two groups of a pair of groups of tubes, one of said positive or negative terminals being the midtap of a midtapped winding; a direct-current circuit connected between said positive and negative terminals; and a plurality of control-circuit voltage-sources for exciting the control-circuits of the respective tubes, said control-circuit voltage-sources serially including two input-frequency voltage-sources of different voltages individual to each tube, the lower-voltage input-frequency source having positive voltage-waves timed suitably for initiating a rectifying operation of the tube to which it is applied, the higher-voltage input-frequency source having positive voltage-waves timed suitably for initiating an inverting operation of the tube to which it is applied, at least one of said lower-voltage or higher-voltage input-frequency control-circuit waves being peaked, and said control-circuit voltage-sources further serially including a common modulator-frequency variable-bias means, common to all of the tubes of a group, each variable-bias means alternating between a bias of such strength that the positive voltage-waves of both the rectifying and inverting input-frequency control-circuit sources make their respective control-circuits reach the critical tube-firing control-voltage, and a more negative bias which blocks the rectifying, but not the inverting, input-frequency control-circuit sources from making their respective control-circuits reach the critical tube-firing control-voltage, at a modulator-frequency which is different from said input-frequency, the modulator-frequency bias-variation for the positive group of a pair of groups being substantially in the middle of a high-negative-bias condition when the modulator-frequency bias variation for the negative group of said pair of groups is substantially in the middle of a low-negative-bias condition.

16. The invention as defined in claim 14, characterized by said modulator-frequency being lower than said input-frequency.

17. The invention as defined in claim 15, characterized by said modulator-frequency being lower than said input-frequency.

18. An electronic frequency-changer comprising one or more pairs of positive and negative groups of tubes, each tube having a control-circuit, and having a main anode-and-cathode circuit which has a tendency to become conducting whenever the tube is fired by having its control-circuit become sufficiently positive to attain at least a critical tube-firing control-voltage with respect to its cathode at a time when its anode is sufficiently positive with respect to its cathode, each tube and its control-circuit being so related and arranged that the tube, when fired, thereafter has a tendency to remain conducting as long as its anode remains sufficiently positive with respect to its cathode; an alternating-current input-circuit associated with the tubes for supplying input-frequency energy to the tubes or receiving input-frequency energy from the tubes; means for providing a common positive terminal and a common negative terminal for the two groups of a pair of groups of tubes, one of said positive or negative terminals being the midtap of a midtapped winding; a direct-current return-circuit connected between the positive and negative terminals; means for providing a modulator-frequency output-circuit having a voltage dependent upon the terminal-to-terminal voltage of said midtapped winding; and a plurality of control-circuit voltage-sources for exciting the control-circuits of the respective tubes, said control-circuit voltage-sources serially including two input-frequency voltage-sources of different voltages individual to each tube, the lower-voltage input-frequency source having positive voltage-waves timed suitably for initiating a rectifying operation of the tube to which it is applied, the higher-voltage input-frequency source having positive voltage-waves timed suitably for initiating a rectifying operation of the tube to which it is applied, a higher-voltage input-frequency source having positive voltage-waves timed suitably for initiating an inverting operation of the tube to which it is applied, at least one of said lower-voltage or higher-voltage input-frequency control-circuit waves being peaked, and tube-controlling means including a common modulator-frequency variable-voltage means, common to all of the tubes of a group, each modulator-frequency tube-controlling means alternating between a tube-controlling voltage such that the positive voltage-waves of both the rectifying and inverting input-frequency control-circuit sources are permitted to fire their respective tubes if the anodes are sufficiently positive with respect to the cathodes, and a tube-controlling voltage which blocks the rectifying, but not the inverting, input-frequency control-circuit sources from firing their respective tubes, at a modulator-frequency which is different from said input-frequency, the modulator-frequency voltage-variation for the positive group of a pair of groups being substantially in the middle of a firing-permitting voltage-condition when the modulator-frequency voltage-variation for the negative group of said pair of groups is substantially in the middle of a blocking condition.

19. An electronic frequency-changer comprising one or more pairs of positive and negative groups of tubes, each tube having a control-circuit, and having a main anode-and-cathode circuit which has a tendency to become conducting whenever the tube is fired by having its control-circuit become sufficiently positive to attain at least a critical tube-firing control-voltage with respect to its cathode at a time when its anode is sufficiently positive with respect to its cathode, each tube and its control-circuit being so related and arranged that the tube, when fired, thereafter has a tendency to remain conducting as long as its anode remains sufficiently positive with respect to its cathode; an alternating-current input-circuit associated with the tubes for supplying input-frequency energy to the tubes or receiving input-frequency energy from the tubes; means for providing a common positive terminal and a common negative terminal for the two groups of a pair of groups of tubes, one of said positive or negative terminals being the midtap of a midtapped winding; a direct-current return-circuit connected between the positive and negative terminals; means for providing a modulator-frequency output-circuit having a voltage dependent upon the terminal-to-terminal voltage of said midtapped winding; and a plurality of control-circuit voltage-sources for exciting the control-circuits of the respective tubes, said control-circuit voltage-sources serially including two input-frequency voltage-sources of different voltages individual to each tube, the lower-voltage input-frequency source having positive voltage-waves timed suitably for initiating a rectifying operation of the tube to which it is applied, the higher-voltage input-frequency source having positive voltage-waves timed suitably for initiating an inverting operation of the tube to which it is applied, at least one of said lower-voltage or higher-voltage input-frequency control-circuit waves being peaked, and said control-circuit voltage-sources further serially including a common modulator-frequency variable-bias means, common to all of the tubes of a group, each variable-bias means alternating between a bias of such strength that the positive voltage-waves of both the rectifying and inverting input-frequency control-circuit sources make their respective control-circuits reach the critical tube-firing control-voltage, and a more negative bias which blocks the rectifying, but not the inverting, input-frequency control-circuit sources from making their respective control-circuits reach the critical tube-firing control-voltage, at a modulator-frequency which is different from said input-frequency, the modulator-frequency bias-variation for the positive group of a pair of groups being substantially in the middle of a high-negative-bias condition when the modulator-frequency bias variation for the negative group of said pair of groups is substantially in the middle of a low-negative-bias condition.

20. The invention as defined in claim 18, characterized by said modulator-frequency being lower than said input-frequency.

21. The invention as defined in claim 19, characterized by said modulator-frequency being lower than said input-frequency.

22. In combination, means for providing an alternating-current first circuit; means for providing an alternating-current second circuit having a frequency different from the first circuit; and a multi-ignition converter connected for interchanging power between said first and second circuits, each ignitron of the converter having a main anode-cathode circuit, an ignitor, a shield-grid means, and an auxiliary anode; said converter comprising a control-means for each ignitron, including a holding-circuit associated with the auxiliary anode, a shield-grid voltage-source which is modulated at both the frequency of the first circuit and the frequency of the second circuit, and means for energizing the ignitor and the auxiliary-anode holding circuit at the frequency of the first circuit.

23. The invention as defined in claim 22, in combination with phase-adjustment means for adjusting the time, in each first-circuit cycle, at which the ignitor is effectively excited.

24. In combination, means for providing an alternating-current first circuit; means for providing an alternating-current second circuit having a frequency different from the first circuit; and a multi-ignitron converter connected for interchanging power between said first and second circuits, each ignitron of the converter having a main anode-cathode circuit, an ignitor, a shield-grid means, and an auxiliary anode; said converter comprising a control-means for each ignitron, including a holding-circuit associated with the auxiliary anode, a shield-grid voltage-source which is square-wave modulated at the second-circuit frequency, low-peak voltage modulated at the first-circuit frequency and phased suitably for initiating the rectifier-operation of the ignitron, and high-peak voltage modulated at the first-circuit frequency and phased suitably for initiating the inverter-operation of the ignitron, means for energizing the ignitor at the first-circuit frequency and phased suitably for determining the time, in each first-circuit cycle, at which the ignitor is effectively excited, and holding-circuit energizing-means, for exciting the holding-circuit of the auxiliary anode so as to thereafter maintain a holding-arc for at least approximately 120 degrees of the first-circuit frequency.

JOHN L. BOYER.
CHARLES GORDON HAGENSICK.